United States Patent [19]

DeMars

[11] Patent Number: 5,369,905
[45] Date of Patent: Dec. 6, 1994

[54] SLIDER AND STOP ATTACHMENT FOR A FISHING LINE

[76] Inventor: Lewis S. DeMars, 53444 Koko St., Scappoose, Oreg. 97056-2710

[21] Appl. No.: 192,338

[22] Filed: Feb. 7, 1994

[51] Int. Cl.⁵ .................. A01K 91/04; A01K 95/00
[52] U.S. Cl. ............................... 43/42.74; 43/44.91
[58] Field of Search ............ 43/44.89, 44.91, 44.94, 43/42.74, 44.9, 27.4

[56] References Cited

U.S. PATENT DOCUMENTS

| | | | |
|---|---|---|---|
| 1,720,287 | 7/1929 | Moore | 43/42.74 |
| 2,709,287 | 5/1955 | Shelton et al. | 43/42.74 |
| 3,426,468 | 2/1969 | Hinkson | 43/42.74 |
| 3,491,477 | 1/1970 | Karras et al. | 43/44.84 |
| 3,650,063 | 3/1972 | Pierce et al. | 43/42.74 |
| 3,703,047 | 11/1972 | Schenavar et al. | 43/43.15 |
| 4,124,154 | 11/1978 | O'Russa | 43/4 X |
| 4,361,977 | 12/1982 | Lawler | 43/44.83 |
| 4,989,360 | 2/1991 | Lewis | 43/42.49 |

FOREIGN PATENT DOCUMENTS

| | | | |
|---|---|---|---|
| 569118 | 7/1958 | Belgium | 43/44.91 |
| 2513852 | 4/1983 | France | 43/44.91 |

Primary Examiner—Kurt C. Rowan
Attorney, Agent, or Firm—Rhodes & Ascolillo

[57] ABSTRACT

An apparatus for adjustably and detachably connecting an additional fishing rig consisting of a hook and a bait to a fishing line is described as having a slider member and a stop member. The slider member is freely moveable on the line while the stop member can be fixed thereon at a desired distance from the usual fishing rig. The stop member is larger than the slider member to prevent the slider and the leader thereon from moving closer to said usual fishing rig than a predetermined distance. The slider member has coiled members connected by angler portion to which a leader is tied.

3 Claims, 2 Drawing Sheets

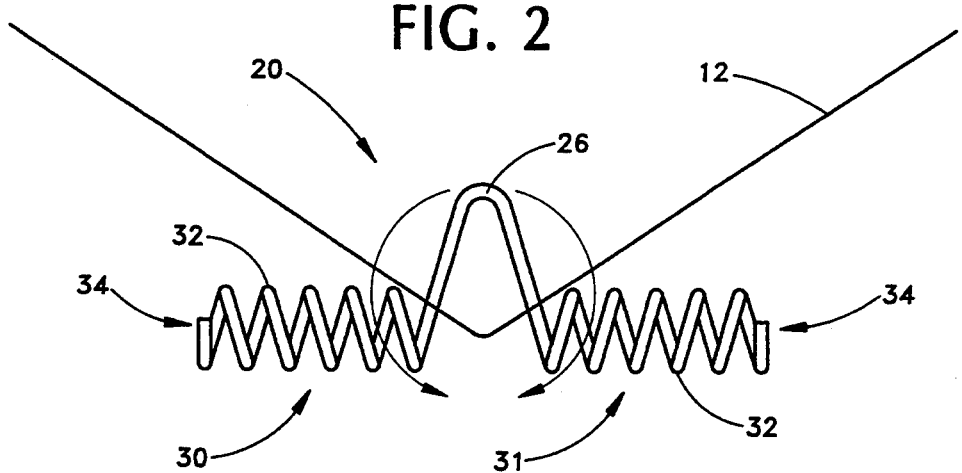
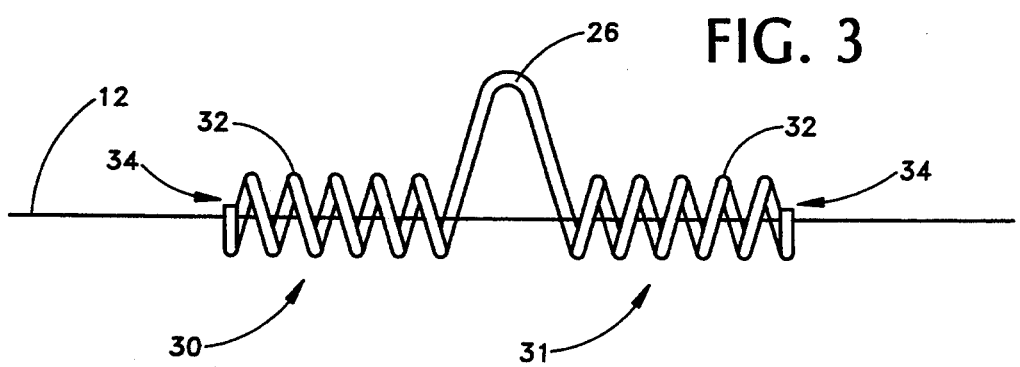
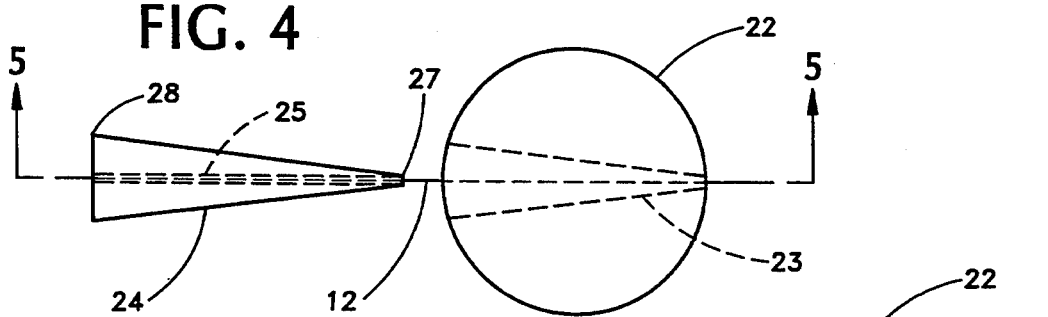
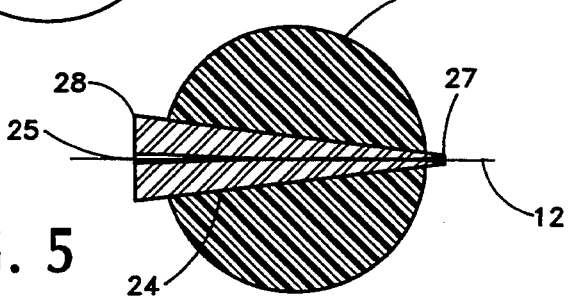

SLIDER AND STOP ATTACHMENT FOR A FISHING LINE

BACKGROUND OF THE INVENTION

1. Field of the Invention

This invention relates generally to a displaceable attachment for association with a fishing line for selectively positioning thereon an additional fishing rig.

2. Description of the Related Art

U.S. Pat. No. 4,989,360 discloses an apparatus for a detachable connection to a fishing line. The apparatus has a guide structure with first and second generally coiled guide portions, which are respectively carried at opposite ends of a longitudinally extending shank-like body portion. There is also a relatively flexible coiled element which is situated about the shank-like body portion.

U.S. Pat. No. 3,491,477 discloses a fishing tackle attachment device comprising a link having opposite end loops interconnected by a shank portion which is separable in order to open either loop. One loop receives a line bearing member which has a central passage for receiving the terminal portion of a fishing line or leader so that the link and the fishing line are movable relative to one another. The other loop is employed to secure terminal fishing tackle such as a sinker, float or hook.

U.S. Pat. No. 3,650,063 discloses a fishing device including a plurality of outriggers made from a resilient material, having a Z-shape and pivotally attached to rotate around a vertical drop wire.

U.S. Pat. No. 3,703,047 discloses a detachable outrigger fishing device, generally comprising a short compression coil spring which detachably holds an L-shaped outrigger and is mounted on a vertical drop wire. The outrigger is secured on the drop wire by pairs of fixed stops above and below a pair of bearing beads, which are rotatably mounted on the drop wire and which support the helical compression coil spring.

U.S. Pat. No. 4,361,977 discloses a fishing line attachment apparatus, generally comprising a continuum of coaxial helixes disposed in a spaced longitudinal relation. The helixes define an axial aperature through which a line or anchor pin may be received. An elastic core is disposed within the aperature in frictional engagement with at least one of the helixes. By stretching the elastic core, frictional engagement is released, allowing sufficient space to attach or disconnect the connecting device.

SUMMARY OF THE INVENTION

While the above devices are usually acceptable for their intended purposes, they have not proven to be entirely satisfactory. For example, they are often complex and expensive to manufacture, or bulky and inconvenient to use. Sometimes, they require unusual skill and/or dexterity to operate. In addition to the devices disclosed in the above mentioned patents, anglers have resorted to sliding a small, round floating lure (called a "corky") down the main fishing line and then jamming a tooth pick up into the hole of the "corky", then breaking it off inside in order to force the "corky" to stay in one spot on the line without slipping. In order to add new bait using this arrangement, a small hook and a snap-swivel is placed directly on the main fishing line and is allowed to slide down. However, if a large fish is hooked on the slider rig using this type of apparatus on the line, the fish can snap the line because the line can kink around the tiny wire of the snap-swivel, thereby severely weakening or reducing the strength of the line. Moreover, snap-swivels have been known to become unlocked for various reasons, especially when a large fish pulls directly against it.

With the present invention, there is no binding effect when a fish snaps against the slider, thus the swivel will stay hooked. Additionally, the line is free to slide up and down the slider, thereby reducing the amount of friction which could result in the line being cut. Because it is relatively short, the slider does not kink the main line or weaken it. The slider can be made heavy enough so that there is no need for an additional weight to get it down to the stop member. Another advantage of the present arrangement is that the slider is relatively easy to put on or remove than is a simple snap-swivel, especially when the angler's hands are cold. By using a rubber insert in the stop member, the member is made to remain steadfast on the line without the risk of breaking off, as when a toothpick or other similar device is used.

The use of the combination slider and stop rig of the present invention saves anglers a lot of time and trouble by rendering it unnecessary to reel in the fishing line to replace or change the lure or bait. It is particularly advantageous when fishing in an area where it is difficult to position the fishing line where needed, or in a fishing area where the rods of other anglers are so close together that repeated retrieving of the line is annoying to other anglers.

In fisherman's terms, the present attachment provides a convenient way for anglers to slide a second rig (a lure with bait, e.g.) down the main fishing line of a rod without requiring reeling in the first rig. As anglers well know, adding a second rig is often desirable when fishing for certain types of fish.

Accordingly, the principal object of this invention is to provide a device or article of this character which combines simplicity, strength, and durability, together with inexpensiveness of construction.

Another object of the invention is to provide an attachment which will allow a fishing line to pass therethrough in one direction while stopping it in the other direction.

The present invention achieves the above objects, among others, by providing in one aspect an apparatus for selectively and removeably attaching an additional fishing rig to a fishing line. The apparatus includes a stop member apertured longitudinally therethrough to permit passage of the fishing line, a locking mechanism associated with the stop member for adjustably immobilizing the stop member at a desired place on the fishing line, and a slider member freely and movably mounted on the fishing line in a spaced relationship to the stop member. The stop member is located intermediate the fish hooking mechanism and the slider member. Additionally, the slider member is associated with the additional fishing rig, and the stop member is of a size so as to prevent the slider member from moving beyond the stop member.

Preferably, the stop member further includes a tapered opening therethrough for allowing passage of the fishing line, and a longitudinally apertured resilient plug member adapted to fit inside the stop member to lock the stop member at the desired place on the fishing line. The slider member further includes a pair of helices formed of coils in spaced relationship, with the helices defining a passageway therethrough for the fishing line, where the pair of helices are united by a central portion for attaching the additional fishing rig thereto. Preferably, the slider member is formed of a rust-proof metal, and the stop member is ball-shaped and having a given diameter. The plug member should have a length greater than the diameter of the stop member, so that at least one end of the plug member protrudes out of the stop member. Likewise, the plug member is complementarily tapered to fit snugly within the tapered opening of the stop member. Also, the stop member is of a substantially rigid material and the plug member is of a substantially resilient material.

Other objects of this invention will in part be obvious and in part hereinafter pointed out.

BRIEF DESCRIPTION OF THE DRAWINGS

In the accompanying drawings, like reference characters identify the same or similar parts:

FIG. 2 is an enlarged side elevation of the slider member of the invention and of part of a fishing line about to be associated therewith;

FIG. 3 is the same as FIG. 2, but shows the slider in place;

FIG. 4 is a side elevational view of the stop member associated with the slider member in forming the combinative device of the present invention and showing also the plug member for the stop; and FIG. 5 is a cross-sectional view of the assembly of FIG. 4 taken along line 5—5 thereof.

DETAILED DESCRIPTION OF THE PREFERRED EMBODIMENT

Figure 1:
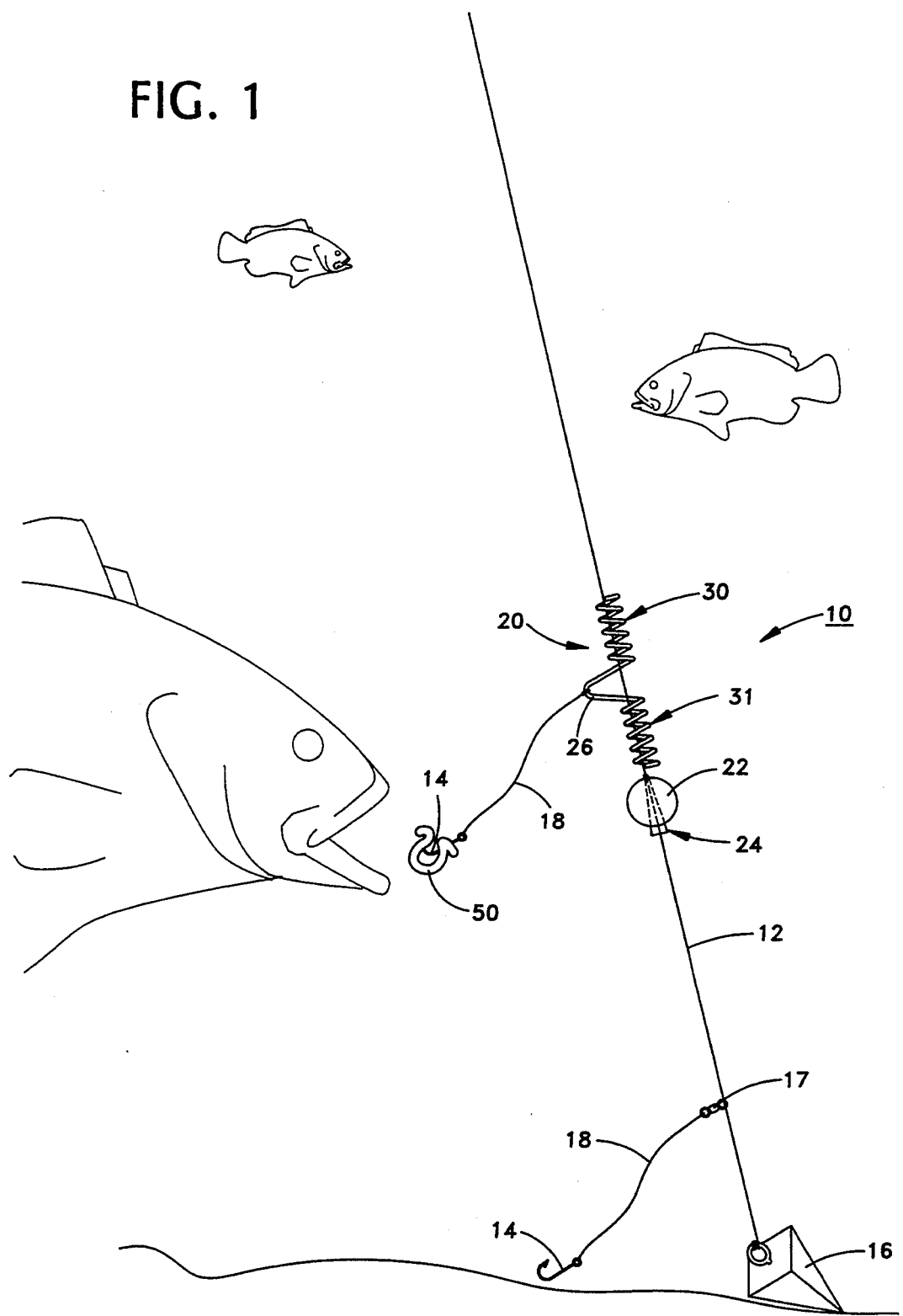
FIG. 1 is a pictorial representation showing the device of the invention in use.

With reference to the drawings, there is shown and illustrated a fishing line attachment constructed in accordance with the principles of the invention and designated by reference character 10, and which comprises several interrelated major components.

Referring to FIGS. 2 and 3, the slider member 20 of the present invention 10 consists of first and second coil portions 30 and 31 of a given height and diameter, and formed from a plurality of coaxial helices as at 32, disposed in spaced longitudinal relation and which define an axial aperture 34 adapted to receive fishing line 12 therein. The two coil portions 30 and 31 are united by an eye 26 which can be two or three time larger or higher to receive a tying leader 18, as shown in FIG. 1.

The slider member 20 is made of a rust-proof material such as steel wire shaped in a spiral or helical manner.

A practical overall length for slider 20 is approximately two inches. The cross-section of the wire is not critical and it can be, among other shapes, circular, elliptical, or even flat. In usual fashion, the distal end of leader 18 has a hook 14 secured thereto, and on the hook a live or artificial bait 50 may be secured.

The slider member 20 is fully movable on fishing line 12 up to the point where it meets the stop member 22, as shown in FIG. 1.

In a practical embodiment of the invention the stop member can be a ball, made of plastic or other suitable material, measuring approximately from 9/16 of an inch in diameter down to ⅜ of an inch in diameter. Any suitable material, such as plastic, can be used for the stop member. As shown in greater detail in FIGS. 4 and 5, the stop member 22 has a tapered opening 23 therethrough. The stop member 22 is provided with a resilient plug member 24 which is also tapered and complementarily profiled so as to fit inside the tapered opening 23 of the stop member 22. The plug member 24 has a longitudinal passageway therein at 25 to permit passage of fishing line 12. Preferably, the plug member 24 is made of rubber or other resilient material. In any event, the plug member 24 should be softer than the material of which stop member 22 is made in order to be securely force fitted therein, preferably as shown in FIG. 5. The length of plug member 24 is greater than the diameter of stop number 22. In particular, the proximal end 28 of stop member 22 protrudes about ¼ of an inch outside stop number 22 so as to permit handling thereof between the thumb and index fingers. At its thinnest or distal end 27, the plug member 24 also protrudes somewhat by around ⅛ of an inch to provide guide means for line 12. The device of the invention is very easy to place and remove from a fishing line.

In use, the stop member 22 is slid on to the line along with the plug member 24. The stop member 22 is positioned at the desired spot on the fishing line 12 and the plug member 24 is passed through the stop member 22 until it is locked snugly onto the fishing line 12. A fishing rig comprising a snap-swivel 17 attached to the fishing line 12 is provided as desired between the end of the stop member 22 and the sinker 16. The leader 18 can be tied about two feet from the lower end of stop member 22, but the actual distance therefrom will vary according to the depth of the water where the angler wishes to fish. The slider 20 is then threaded on the line 12, as shown by the arrows on FIG. 2. Another leader 18 is attached next to the eye 26 of slider 20, either alone or through another snap-swivel 17. The slider 20 is allowed to slide downwardly until it meets the upper end of stop 22 so as to prevent further downward movement closer to the rig or nearer the sinker 16. To remove the slider 20 from fishing line 12, it is only necessary to reverse the direction of movement shown by the arrows in FIG. 2.

The present invention also contemplates using several slider and stop assemblies on a given fishing line. It also contemplates a modification thereof wherein one or more additional leaders 18 are fixed on the slider 20, above and below the eye 26.

The device of the invention has been thoroughly tested under actual use conditions and has been found to be completely successful for the accomplishment of the above-stated objects of the present invention.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use. It is thought that persons skilled in the art to which this invention relates will be able to obtain a clear understanding of the invention after considering the foregoing description in connection with the accompanying drawing. Therefore, a more lengthy description is deemed unnecessary.

It is to be understood that various changes in shape, size and arrangement of the elements of this invention, as claimed, may be resorted to in actual practice, if desired.

Having thus described the invention, what is claimed as new and to be secured by Letters Patent is:

1. An apparatus, having at its lower end a sinker and fish hooking means, for selectively and removably attaching an additional fishing rig, comprising:

a fishing line;

a stop member apertured longitudinally therethrough to permit passage of said fishing line;

a locking means associated with said stop member for adjustably immobilizing said stop member at a desired place on said fishing line;

a slider member freely and movably mounted on said fishing line in a spaced relationship to said stop member, said stop member being located intermediate said fish hooking means and said slider member;

said slider member having associated therewith said additional fishing rig;

said stop member being of a size such as to prevent said slider member from moving beyond said stop member, said stop member comprising:

a tapered opening therethrough for allowing passage of said fishing line;

said stop member being ball-shaped and having a given diameter; and said stop member being of a substantially rigid material;

a longitudinally apertured resilient plug member adapted to fit inside said stop member to lock said stop member at said desired place on said fishing line;

said plug member having a length greater than said diameter of said stop member, whereby at least one end of said plug member protrudes out of said stop member;

said plug member is complementarily tapered to fit snugly within said tapered opening of said stop member;

said plug member further comprises being of a substantially resilient material; and said plug is substantially comprised of a plastic material.

2. The apparatus according to claim 1, wherein said slider member further comprises a pair of helices formed of coils in spaced relationship, said helices defining a passageway therethrough for said fishing line, and said pair of helices being united by a central portion for attaching said additional fishing rig thereto.

3. The apparatus according to claim 2, wherein said slider member further comprises being formed of a rust-proof metal.

* * * * *